(12) United States Patent
Tuhro et al.

(10) Patent No.: US 8,033,618 B2
(45) Date of Patent: Oct. 11, 2011

(54) OPTIMIZED HYDRAULIC BRAKE SYSTEM

(75) Inventors: Matthew Conrad Tuhro, Sault Ste. Marie, MI (US); Graham Scott Russell, Clarkston, MI (US); Juergen Karner, Nauheim (DE); Paul Anthony Jozefowicz, Highland, MI (US); Yongle Lou, Shelby Township, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 685 days.

(21) Appl. No.: 12/056,365

(22) Filed: Mar. 27, 2008

(65) Prior Publication Data

US 2008/0236970 A1 Oct. 2, 2008

Related U.S. Application Data

(60) Provisional application No. 60/908,244, filed on Mar. 27, 2007.

(51) Int. Cl.
*B60T 8/34* (2006.01)

(52) U.S. Cl. .................. 303/113.3; 303/114.1; 303/155
(58) Field of Classification Search ............... 303/113.3, 303/20, 113.4, 114.1, 114.3, 115.4, 115.5, 303/116.1, 119.1, 155, 157–159
See application file for complete search history.

(56) References Cited

U.S. PATENT DOCUMENTS

| | | | | |
|---|---|---|---|---|
| 4,919,493 A | * | 4/1990 | Leiber | 303/15 |
| 5,531,509 A | * | 7/1996 | Kellner et al. | 303/114.1 |
| 5,938,297 A | * | 8/1999 | Whaite et al. | 303/114.3 |
| 6,142,583 A | * | 11/2000 | Steffes | 303/114.1 |
| 2006/0163941 A1 | * | 7/2006 | Von Hayn et al. | 303/155 |

* cited by examiner

*Primary Examiner* — Pamela Rodriguez

(57) ABSTRACT

In an optimized hydraulic brake system, a pedal travel sensor is used to improve pedal feel. In order to improve pedal feel, a low pressure is detected in the brake booster and the brake hydraulic system is used to increase wheel pressure. This prevents the operator from having to exert an increasing large force on the brake pedal during a deceleration situation.

4 Claims, 3 Drawing Sheets

OPTIMIZED HYDRAULIC BRAKE SYSTEM

This application claims priority from U.S. provisional application No. 60/908,244, filed Mar. 27, 2007; the contents of which is hereby incorporated by reference in its entirety.

BACKGROUND OF THE INVENTION

The present invention relates to a method for regulating a predetermined modifiable brake pressure in the wheel brakes of a brake system, wherein input quantities determining the brake pressure in the individual wheel brakes are evaluated and correcting variables of hydraulic valves are defined in a control and/or data processing system.

Vacuum brake boosters require a vacuum supplied by the engine for boosting the pedal force to be generated by the driver. Depending on the engine, even relatively low pedal forces allow reaching a condition where further increase of the force applied to the actuating unit is possible only by an increase in the pedal force because the vacuum brake booster has reached the maximum possible boosting force. This condition is referred to as the point of maximum boosting of the booster. Braking operations that take place in excess of the point of maximum boosting of the vacuum brake booster place high demands on the driver in terms of the pedal force to be generated. For this reason, brake systems (OHB-V) are employed at an increasing rate supporting the driver by means of an active hydraulic brake pressure build-up. Brake systems of this type generally include a motor-and-pump assembly and a hydraulic unit being controlled by an electronic control such as an electronic stability program (ESP), antilock brake system (ABS), traction control system (TCS), and similar systems, to comply with the desired brake force boosting.

When pressure is built up in the wheel brakes by means of hydraulic boosting beyond the point of maximum boosting of the vacuum brake booster, the (analogized) separating valves are closed, and the hydraulic pump delivers brake fluid from the tandem master cylinder (TMC) into the wheel brakes. In the pressure reduction phase, it is required to discharge the additionally generated pressure into the tandem master cylinder by way of the separating valves in a manner comfortable with respect to pedal feeling and braking effect. This action usually requires two additional pressure sensors at the wheel brakes, one per brake circuit, in order to determine the wheel pressure. The result is a higher requirement of components causing an increase in the system's costs.

During failed boost brake applies, the brake pedal forces required to enter OHB are very high. This is due to the increase of the booster cut-in force at zero vacuum, and the inaccuracies of the master cylinder pressure transducer at low pressures. In prior systems, the driver had to generate enough pedal force to overcome the cut-in force of the booster, before pressure could be built in the master cylinder. Next, the driver had to generate additional force, before the master cylinder pressure transducer would output a reliable signal at which point OHB would start to generate pressure at the wheels. This pedal force can reach 250 Newtons or higher.

In view of the above, an object of the invention is to provide a method for regulating a predetermined variable brake pressure in the wheel brakes of a brake system, wherein when a very low booster vacuum level is detected the OHB system is used to command an increase in wheel pressure.

SUMMARY OF THE INVENTION

According to the invention, this object is achieved by using a brake pedal travel sensor to calculate a virtual pressure. This virtual pressure represents the actual pressure that can be achieved when the booster has normal vacuum present. This virtual pressure is used as an input to the OHB software, to command an increase in wheel pressure An advantage of the present system and method is that there is no need to add an additional pressure sensor to measure the booster pressure. Also, the present system does not require the addition of a pedal force sensor in addition to or replacing the pedal travel sensor.

Further details and advantages can be gathered from the following description and two drawings.

DETAILED DESCRIPTION OF THE DRAWINGS

Figure 1:
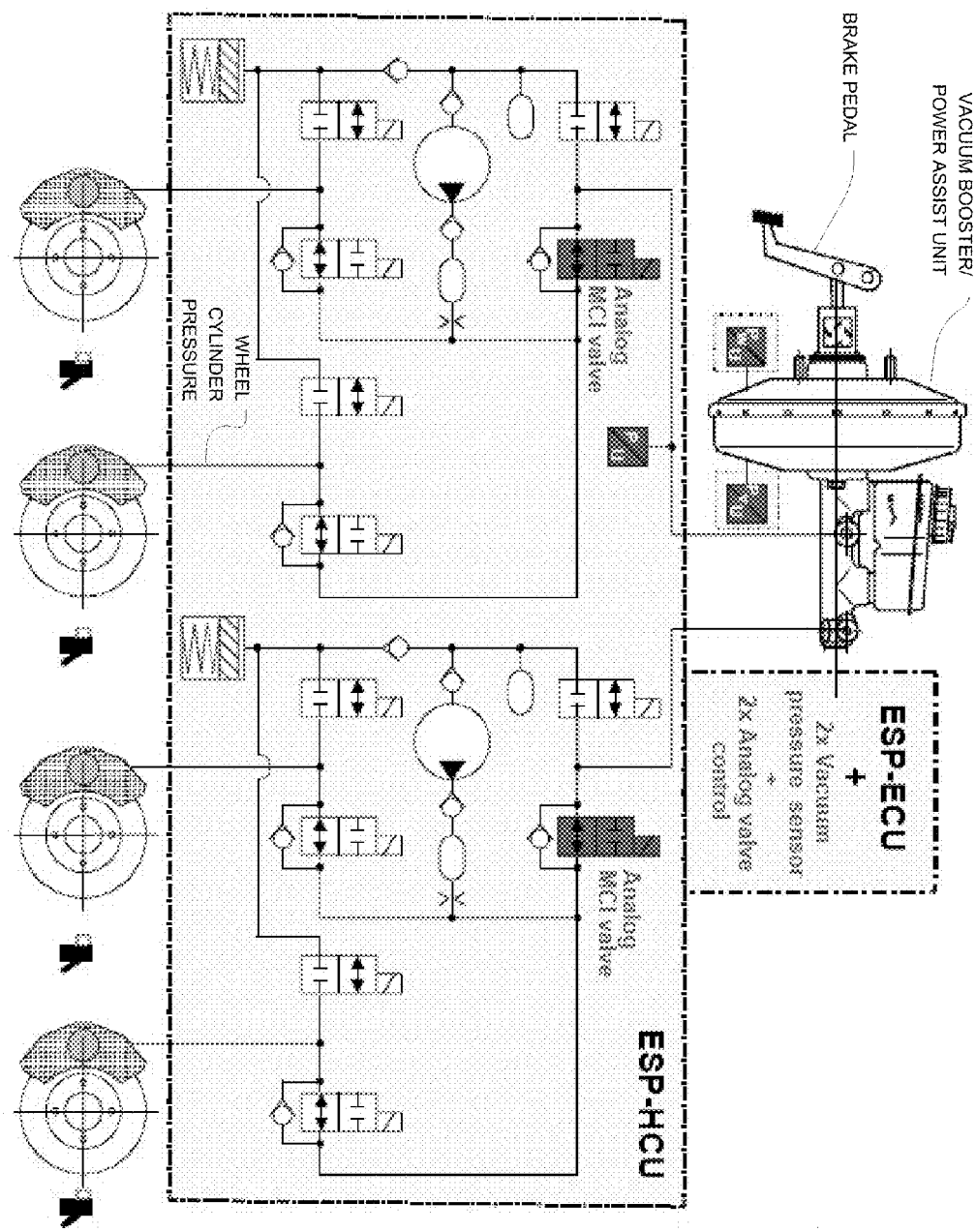
FIG. 1 is a system diagram of a vehicle hydraulic brake system having OHB functionality.

FIG. 1 shows a hydraulic brake system having OHB functionality. Vacuum is delivered by the vehicles engine (not shown) to provide brake power assist to the driver. In conditions when the engine is not capable of delivering enough vacuum to assist the driver, the hydraulics are used to assist the driver.

OHB (Optimized Hydraulic Brake) utilizes the HCU (Hydraulic Control Unit) to build the brake pressure actively to compensate an unavailable vacuum. V means that there is still a vacuum booster in the vehicle available. The brake power assist unit uses vacuum delivered by combustion engines to reinforce the brake power of the driver. Modern vehicle engines are no longer able to provide enough vacuum for the brake power assist unit (direct injection gasoline engines). A lack of vacuum during the engines cold start phase is a result from tighter emission standards. The engines throttle has to stay open and so there is no or less vacuum available. To serve the driver the same brake behavior during cold start phase as it is during normal operation mode, the hydraulics are used to reinforce the drivers brake power.

Figure 2:
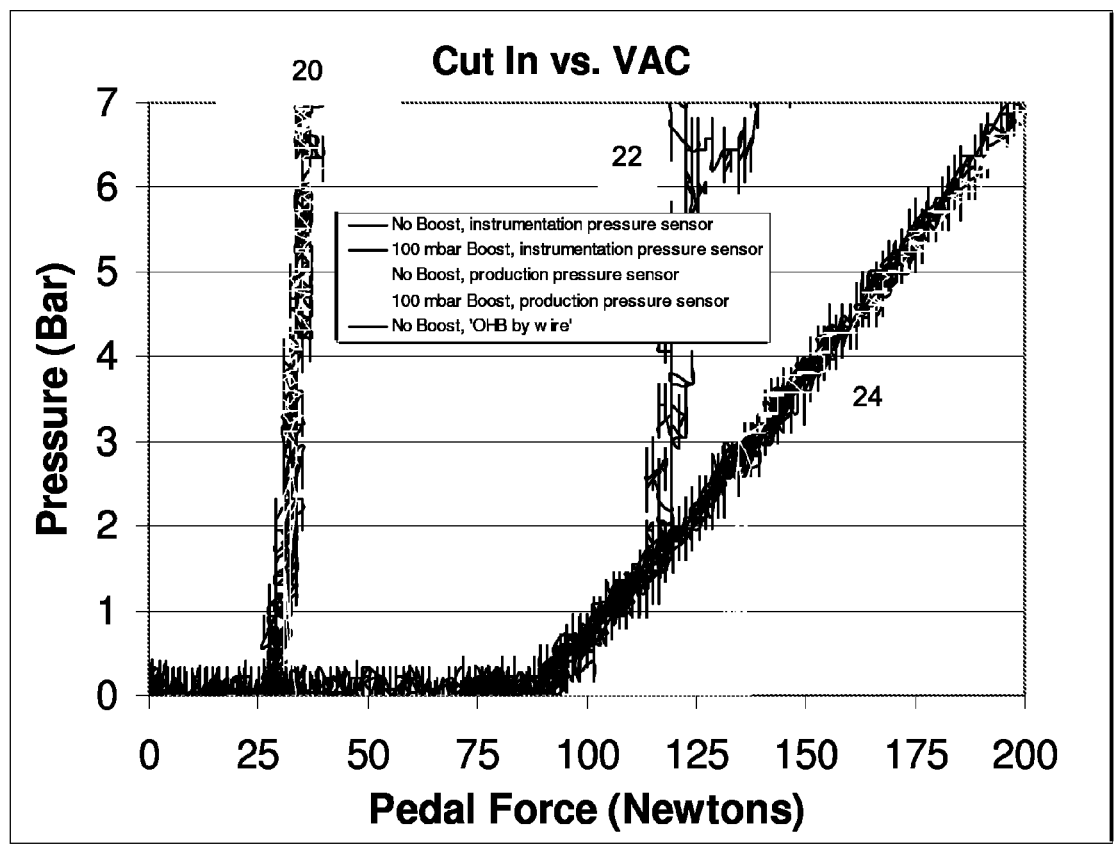
FIG. 2 shows the function of the present system.

FIG. 2 shows the function of the present system. The x-axis shows the brake pedal force and the y-axis shows the wheel/master cylinder pressure. FIG. 2 illustrates that the system generates wheel pressures sooner than the previous method OHB methods. Line 20 shows that when a pressure sensor is used to determine the pressure level in the booster that pressure may be built up quickly with a relatively low pedal force applied by the driver. Lines 22 and 24 show that when the booster is not used it takes a much greater pedal force to result in an increase in brake pressure. Line 20 also demonstrates that with the previous systems sensors, the signal is relatively inaccurate.

Figure 3:
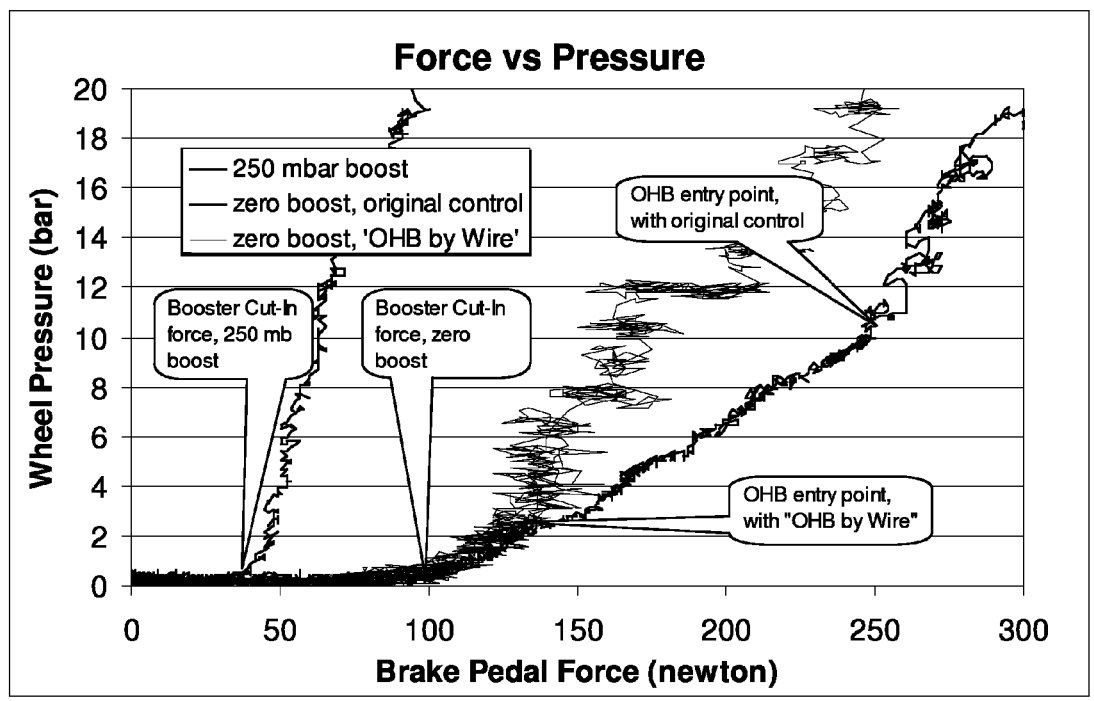
FIG. 3 shows the current calibration of the present system.

FIG. 3 shows a calibration of the present system. The x-axis shows the brake pedal force and the y-axis shows the wheel pressure. The drawing shows that the present system starts to generate wheel pressure shortly after the booster cut-in force has been exceeded. Also FIG. 3 illustrates that signal is more accurate than in the previous systems.

FIG. 3 shows that in normal operating conditions, the booster cut-in force provides approximately 250 mb boost. When the booster is in a low vacuum level there is a zero boost and a larger pressure needs to be applied by the operator in order to create a wheel pressure.

With the current system, when the booster has a low vacuum level, the system provides assistance to the operator when the pedal has traveled a distance that occurs when approximately 125 N is applied to the pedal. The pressure applied provides a more accurate signal, with less variances, then the signal with no pressure assistance. This shows that the present system not only increases brake pressure with a reduced operator effort, but also provides an enhanced pedal feel. Furthermore, the increased brake pressure will allow the vehicle to decelerate more rapidly and decreases stopping distance in a panic stop situation.

The many features and advantages of the invention are apparent from the detailed specification. Thus, the appended claims are to cover all such features and advantages of the invention that fall within the true spirit and scope of the invention. Furthermore, since numerous modifications and variations will readily occur to those skilled in the art, it is not desired to limit the invention to the exact construction and operation illustrated and described. Accordingly, appropriate modifications and equivalents may be included within the scope of the invention.

Although this invention has been illustrated by reference to specific embodiments, it will be apparent to those skilled in the art that various changes and modifications may be made which clearly fall within the scope of the invention.

The invention claimed is:

1. A brake system for a vehicle comprising:
   a booster;
   a pressure sensor for sensing a pressure in the booster;
   a brake pedal for receiving brake input from an operator of the vehicle;
   a brake pedal travel detector for detecting an amount of travel of the brake pedal;
   a pump for providing hydraulic pressure to one or more wheels of the vehicle in response to the amount of travel of the brake pedal; and
   a controller for controlling the amount of pressure provided to one or more wheels, wherein the controller provides more pressure to the one or more wheels when the pressure sensor detects a low booster pressure and the brake pedal travel detector detects a movement of the brake pedal, wherein the pressure sensor is a vacuum transducer and when a very low booster vacuum level is detected with the vacuum transducer, the brake pedal travel sensor is used to calculate a virtual pressure, and wherein the virtual pressure represents an actual pressure that could be achieved, when the booster has normal vacuum present and the virtual pressure is used as an input to the controller.

2. The brake system of claim 1, wherein the wheel pressure is increased when the travel pedal sensor detects pedal movement that is approximate to 125 Newtons of forces applied to the pedal.

3. A method for providing brake pressure assistance to a driver of a motor vehicle, the method comprising:
   providing a brake booster;
   sensing a pressure in the booster;
   receiving a brake input from an operator of the vehicle;
   detecting an amount of travel of the brake pedal;
   providing hydraulic pressure to one or more wheels of the vehicle in response to the amount of travel of the brake pedal; and
   controlling the amount of pressure provided to one or more wheels, wherein the controller provides more pressure to the one or more wheels when a low booster pressure is detected and movement of the brake pedal is detected, wherein when a very low booster vacuum level is detected movement of the brake pedal is used to calculate a virtual pressure, and wherein the virtual pressure represents an actual pressure that could be achieved, when the booster has normal vacuum present and the virtual pressure is used as an input to the controller.

4. The method of claim 3, wherein the wheel pressure is increased when the detected pedal movement that is approximate to 125 Newtons of forces is applied to the pedal.

* * * * *